Patented June 26, 1951

2,558,011

UNITED STATES PATENT OFFICE 2,558,011

RECOVERY OF HYDROCHLORIC ACID

Jerome W. Sprauer, Niagara Falls, N. Y., and Norman D. Peschko, Haddonfield, N. J., assignors to The Pennsylvania Salt Manufacturing Company, Philadelphia, Pa., a corporation of Pennsylvania No Drawing. Application January 29, 1947, Serial No. 725,146

11 Claims. (Cl. 23—154)

This invention relates to the purification and recovery of hydrogen chloride resulting from the chlorination of organic compounds.

It has long been known that in the chlorination of organic compounds by means of gaseous chlorine, particularly by substitution reactions, HCl gas is given off. This material has heretofore usually been considered a waste by-product, since attempts directed to recovery have proven such recovery processes difficult and prohibitively expensive, in order to obtain a hydrochloric acid substantially free from such impurities as chlorine, and low molecular weight oxygenated and/or chlorinated organic compounds. These attempts have been chiefly directed to methods for the absorption of such contaminants by passing the gas stream over materials such as activated carbon and silica gel, or by scrubbing the gas mixture with organic solvents whereby HCl is said to be absorbed while the impurities are not. A further process involves the recovery of HCl by dissolving in water which is kept at nearly the boiling point, whereby the HCl is said to be absorbed, and the organic material, by virtue of the high temperature, is eliminated. These prior art processes involve difficulties which limit their use. For example, many organic materials are not readily absorbed by solid materials and, in fact, some may form a coating over the surface of such materials thereby rendering them ineffective. High temperature absorption of HCl is undesirable, since the relatively high vapor pressure of HCl causes significant amounts of HCl to be lost, thereby rendering the process uneconomical. This type of process has the further disadvantage in that removal of relatively high boiling organic impurities is ineffective.

We have now discovered a simple and economical means for the recovery of HCl when contaminated with organic impurities by a process which substantially completely obviates the objections to prior art processes. The process of our invention involves the initial steps of (1) scrubbing the contaminated HCl gas with $H_2SO_4$, and (2) removing elemental chlorine, followed by the successive steps of (3) scrubbing the gas thus treated with a high boiling organic liquid capable of dissolving organic impurities present (such as chlorinated hydrocarbons), and of sufficiently low volatility and inertness to avoid the introduction of additional impurities during this treatment, (4) adding a minor proportion of a gas which is inert to the treated by-product hydrogen chloride gas and of low solubility in the hydrochloric acid absorption system, (5) contacting the resulting gas mixture with water at a temperature substantially below its boiling point whereby hydrogen chloride is absorbed to form an extremely pure hydrochloric acid solution, while traces of impurities remaining in the gas up to this step pass on with the unabsorbed gases. The initial steps (1) and (2) may be carried out in that order or in the reverse order, but are preferably carried out in the order indicated. If the gas about to enter step (3) contains a substantial amount of water, a drying step is preferably introduced at this point. A second $H_2SO_4$ wash at this point has been found advantageous and will, of course, accomplish the drying of the gas referred to.

In preferred operation the sulfuric acid for step (1), or for at least one of the sulfuric acid washes, if two are employed, is of 60-100% concentration. For the removal of chlorine in step (2) we preferably treat the gas with a metal wet with a mineral acid solution of the reaction products of the metal and chlorine, although other reactions for removing chlorine from a gas may be employed, for example reaction of the chlorine with naphthalene, or other organic compound of high reactivity with chlorine, dissolved in an oil used to scrub the gas.

For the organic scrubbing liquid of step (3) we preferably employ a liquid no substantial part of which boils below about 400 F., and the vapor pressure of which at 20° C. is not greater than 0.1 mm. Hg. The organic scrubbing liquid should be capable of dissolving at least 1 gram of ethyl chloride vapor per 100 grams of scrubbing liquid at 20° C. and 5 mm. ethyl chloride pressure. Our preferred scrubbing liquids have the following specifications:

*Vapor pressure.*—0.001 to 0.01 mm. Hg at 20° C. (estimated).

*Boiling point.*—500-900° F.

*Solubility of gaseous impurities in scrubbing liquid.*—At least 3 grams of volatile waste products (as ethyl chloride) in 100 grams of scrubbing liquid, at 20° C. and 5 mm. ethyl chloride pressure.

We have found it most advantageous to employ one of the commercially available paraffinic mineral oils of the above specification. A halogenated derivative of such an oil may also be employed. A specific halogenated derivative of the oil is chlorinated gas oil; such a derivative could contain various amounts of chlorine depending on the extent of chlorination and the size of the oil molecule. Assuming, for instance, that the oil is $C_{24}H_{50}$, then monochlorinated gas oil would contain 7-10% of chlorine.

Other organic liquids which satisfy the boiling point and vapor pressure specifications and which would dissolve considerable amounts of the volatile impurities without reacting with the hydrogen chloride are: alcohols such as sec. undecyl alcohol, sec. tetradecyl alcohol, and sec. heptadecyl alcohol; ethers such as hexyl ether, ethylene glycol monophenyl ether, ethylene glycol monobenzyl ether, and diethylene glycol mono butyl ether; and glycols such as 1,3-butylene glycol, decylene glycol, diethylene glycol, dipropylene glycol and triethylene glycol.

In step (4) we preferaby employ air to the amount of 5 to 30% by weight of the treated by-product hydrogen chloride gas, though nitrogen, oxygen, carbon dioxide, flue gas, cracked ammonia or similar gases may be employed.

In step (5) we preferably employ a temperature of about 40° to 60° C. and a suitable proportion of water to make the desired concentration of acid.

By the process of our invention, initially contaminated HCl is recovered as a clear, colorless, substantially chemically pure acid essentially free from foreign odors, and of any suitable concentration, for example the commercially desirable concentration of 18 to 22° Bé. (28 to 36% HCl by weight).

One of the chief applications of our invention is in the recovery of pure hydrochloric acid from the HCl evolved when ethanol is chlorinated with gaseous chlorine. This process is of great current importance because the product, chloral, is used in the preparation of the insecticide 2,2-bis(p-chlorophenyl)-1,1,1-trichloroethane (hereinafter called DDT). Heretofore, the recovery of this gas, containing as impurities chlorine, oxygenated organic compounds, e. g. ethanol, acetaldehyde, paraldehyde, ethyl hypochlorite, chlorinated acetaldehyde, chlorinated acetals, etc., and chlorinated aliphatic hydrocarbons, e. g., ethyl chloride, chloroform, etc., has been considered uneconomical and hence this by-product gas, to the best of our knowledge, has heretofore usually been discarded. In view of the increasing importance of DDT it is evident that a process for the recovery of the HCl by-product is a need greatly felt by the industry. Our invention provides such a process.

According to a preferred method of employing our invention the by-product gas from the chlorination of ethanol is passed through a series of scrubbing towers as hereinafter described.

The by-product gaseous material from the chlorination of ethanol by means of gaseous chlorine may first be passed through an acid scrubbing tower, of conventional design, through which is recycled relatively concentrated sulfuric acid counter-current to the gas flow, e. g. 60 to 100% $H_2SO_4$. This may, if desired, be the waste $H_2SO_4$ from the chloral-chlorobenzene condensation to make DDT. We have found that this treatment removes the major proportion of organic impurities.

The gas now passes through a similar scrubbing tower packed with iron and in which an aqueous hydrochloric acid-ferric chloride solution is used as the scrubbing material. Any free chlorine which may have come over from the chlorination step reacts with this acid-iron chloride-water system. The iron chloride solution, made strongly acid by absorbed HCl, is recirculated through the tower counter-current to the gas flow. From time to time ferric chloride may be recovered from the solution and utilized as a by-product of our process. This step is carried out most advantageously by employing a liquid highly concentrated in acid and ferric chloride, in quantity not much greater than is needed merely to wet the surface of the iron.

The gas now passes into a second sulfuric acid scrubbing tower similar in design and operation to the first. The function of this tower is to dry the gas. The first acid scrubbing tower may be omitted, in which case the function of this tower in addition to drying the gas from the iron-ferric chloride tower, is to remove the major proportion of the organic impurities contained in it. The gas then passes to an oil scrubbing tower, similar in design and operation to the acid scrubbing tower. Paraffinic mineral oil, e. g. one of the commercially available oils boiling above about 500° F. and having a flash point not greatly below 300° F., is advantageously used as the scrubbing material; this step may be operated substantially to remove remaining organic material which would otherwise impart a foreign odor to the final product, noticeable when diluted to about 3-4% with water, or this step may be operated to remove substantially completely the relatively involatile organic impurities, leaving small amounts of highy volatile impurities to be removed by venting in the subsequent absorption step.

On leaving the oil scrubbing tower, air is introduced, preferably in amount of about 10% by weight of the HCl gas, mixed with the essentially pure HCl, and passed into an aqueous absorber of conventional design operated at about 40° C., which removes by absorption substantially all of the HCl. The air, aided by the somewhat elevated temperature, serves to sweep out remaining impurities such as ethyl chloride, traces of hydrogen, and the like. The HCl is absorbed in the solution, which may or may not be recycled, to any desired strength, usually about 32%, and is clear, colorless, odorless and substantially chemically pure.

The following examples are illustrative of our invention.

*Example 1*

Contaminated HCl from the chlorination of ethanol was led into the first sulfuric acid scrubber designed so that the contact time between gas and acid was about 9 seconds. The scrubbing acid was relatively concentrated sulfuric acid ca. 80%, and may be the by-product acid previously used as a catalyst in the condensation of chloral with monochlorobenzene, a step in the production of DDT. The gas then passed into an iron packed scrubbing tower in which aqueous hydrochloric acid-ferric chloride was used as the scrubbing material, namely a recirculated solution containing 24 to 32% HCl and 29 to 8% ferric chloride. The design of this scrubber was preferably such that the contact time between the gas and the iron chloride solution was about 17 seconds. This removed any chlorine which may have remained unreacted from the initial chlorination of ethanol. The gas then passed into the second acid scrubber whose design may be similar to the one above described. The acid used in this scrubber may be of the same origin as that of the first tower. The function of this scrubber is to dry the gas in preparation for the next step. The dried gas then passed into an oil scrubber which removed substantially all of the remaining organic materials, and was designed so that the contact time between the gas and oil was about 26 seconds. Predominantly paraffinic mineral oil of a viscosity of 50 to 100 Saybolt at 100 F., boiling range within about 550 to 850 F., and a flash point of from 300 to 400 F. is a preferred material for this step. The gas was then substantially free from impurities, but there may have remained small traces of materials such as thyl chloride. These were eliminated by admitting air into the system immediately prior to the final step, which comprised absorption of HCl in water at an absorption temperature of about 40° C. About 10% by volume of air was admitted, and with the absorber operating at about 40° C., we found that substantially all of the remaining impurities were removed by venting to the atmosphere, so that the resulting product, as obtained in the absorber, was clear, colorless, essentially free from foreign odors, and substantially chemically pure.

In this preferred process, as explained above, we used relatively concentrated sulfuric acid in both of the acid scrubbers, which may advantageously be by-product acid, heretofore discarded, from the condensation of chloral and monochlorobenzene to form DDT. This acid, of about 65% free sulfuric acid concentration, may advantageously be first used in the second acid scrubber, where it is circulated until the moisture absorbed lowers the concentration to about 60% free sulfuric acid at which concentration its dehydrating power remains sufficiently high for drying the gas. The acid is now transferred to the first acid scrubber where as we have found, about 30% free sulfuric acid is sufficiently strong to remove the major portion of the organic contaminants. In the ferric chloride scrubber we have found that ordinary iron turnings of a suitable size corresponding to the scrubbing tower design are suitable as packing material.

For convenience our invention has been described in terms of the recovery of HCl from the chlorination of ethanol. However, our invention may advantageously be used whenever it is desired to recover HCl from gaseous mixtures comparable in composition to those herein described, for example, those gases obtained from chlorination of other aliphatic oxygenated compounds, e. g. propanol, acetaldehyde, etc.

*Example 2*

A by-product gas from the chlorination of 95% ethanol containing about 0.2% by volume chlorine and organic impurities such as ethanol, acetaldehyde, paraldehyde, chlorinated acetaldehyde, ethyl chloride, etc., was successively passed in counter-current direction through a series of packed scrubbing towers as above described through which were recycled, respectively, 96% sulfuric acid, aqueous ferric chloride solution flowing over iron, 96% sulfuric acid and a paraffinic mineral oil of a boiling range of from 565 to 665° F. The exit gas from the paraffinic oil scrubbing tower was mixed with approximately 10% by weight of air and the hydrogen chloride absorbed from the gas mixture by an aqueous hydrogen chloride solution held at a temperature of about 40° C. The product was 36% hydrochloric acid which was clear, colorless, essentially free from foreign odors, and substantially chemically pure.

*Example 3*

A by-product gas from the chlorination of 95% ethanol containing about 0.8% by volume of chlorine and organic impurities as listed in Example 1 was passed through a scrubbing tower through which was recycled waste sulfuric acid obtained from the condensation of monochlorobenzene with chloral. The gas then passed through a scrubbing tower containing scrap iron turnings as a packing material which were kept wet by recirculating concentrated hydrochloric acid containing ferric chloride over the iron and thence through another sulfuric acid scrubbing tower similar to the first tower. The gas was then passed through a paraffinic oil scrubbing tower as described in Example 1. The exit gas was mixed with about 10% by weight of air and absorbed in water at about 40° C. The resulting product was clear, colorless, essentially free from foreign odors, and substantially chemically pure hydrochloric acid of about 36% concentration.

For purposes of comparison, the following procedures, outside the scope of our invention, were carried out:

*Example 4*

A by-product gas from the chlorination of 95% ethanol containing about 4% by volume chlorine and organic impurities as described in Example 1 was passed through the same purification apparatus as described in Example 1, except that the paraffinic mineral oil scrubbing tower was omitted. The product acid was clear, colorless, and contained no chlorine but possessed a faint, sweet odor when diluted in water to about 3% and warmed to 60° C. in a covered flask. This example shows the effect of elimination of the paraffinic mineral oil scrubbing tower.

*Example 5*

The by-product gas from the chlorination of 95% ethanol containing about 4% by volume chlorine and organic impurities as described in Example 1 was passed through a single scrubbing tower containing iron packing kept wet by recirculating a solution of ferric chloride in aqueous hydrochloric acid. The gas mixture was then absorbed in water. The resulting product was colorless but exhibited considerable cloudiness, contained no chlorine but possessed a definite odor of organic impurities upon diluting to about 3% with water and heating to 60° C. in a covered flask.

The expression "concentrated sulfuric acid" as used herein, is intended to include sulfuric acid within the concentration range of about 50 to 100%.

Since many modifications are possible in the process of our invention as above described without departing from the scope of the invention, it is intended that the above description of our invention should be interpreted as illustrative, and the invention is not to be limited except as set forth in the claims which follow.

We claim:

1. A process for recovery of hydrochloric acid of high purity from a hydrogen chloride gas obtained as a by-product from chlorination of an organic compound, containing chlorine and organic impurities as contaminants, comprising the initial steps of removing elemental chlorine from the gas and scrubbing the gas with sulfuric acid followed by the successive steps of contacting the gas thus treated with a high boiling organic liquid of low volatility and chemically inert toward HCl and capable of dissolving chlorinated hydrocarbons, thereafter adding a minor proportion of a gas which is inert to HCl and of low solubility in water and aqueous hydrochloric acid, and thereafter contacting the resulting gas mixture with water at a temperature substantially below its boilng point to dissolve HCl in the water and form hydrochloric acid.

2. A process for recovery of hydrochloric acid of high purity from a hydrogen chloride gas obtained as a by-product from chlorination of an organic compound, containing chlorine and organic impurities as contaminants, comprising the initial steps of removing elemental chlorine from the gas and scrubbing the gas with aqueous sulfuric acid, followed by the successive steps of contacting the gas thus treated with an organic liquid no substantial part of which boils below about 400° F., the vapor pressure of which at 20° C. is not greater than 0.1 mm. Hg, capable of dissolving at least 1 gram ethyl chloride vapor per 100 grams scrubbing liquid at 20° C., chemically inert toward HCl and unreactive with the organic compounds in the gas to form volatile reaction products, thereafter adding a minor proportion of a gas which is inert to HCl and of low solubility in water and aqueous hydrochloric acid, and thereafter contacting the resulting gas mixture with water at a temperature substantially below its boiling point to dissolve HCl in the water and form hydrochloric acid.

3. A process for recovery of hydrochloric acid of high purity from a hydrogen chloride gas obtained as a by-product from chlorination of an oxygenated organic compound, containing as contaminants elemental chlorine, chlorohydrocarbons, and oxygen-containing organic compounds, comprising the initial steps of removing elemental chlorine from the gas, and scrubbing the gas with aqueous sulfuric acid of concentration in the range of about 60 to 100%, followed by the successive steps of contacting the gas thus treated with an organic liquid no substantial part of which boils below about 400° F., the vapor pressure of which at 20° C. is not greater than 0.1 mm. Hg, capable of dissolving at least one gram ethyl chloride vapor per 100 grams scrubbing liquid at 20° C., chemically inert toward HCl and unreactive with contaminants remaining in the gas to form volatile reaction products, thereafter adding a minor proportion o fa gas which is inert to HCl and of low solubility in water and aqueous hydrochloric acid, and thereafter contacting the resulting gas mixture with water at a temperature in the neighborhood of about 40 to 60° C. to dissolve HCl in the water and form hydrochloric acid.

4. A process for producing substantially pure hydrochloric acid essentially free from foreign odors from an impure hydrogen chloride gas obtained as a by-product from the chlorination of an aliphatic oxygenated compound, said impure hydrogen chloride gas containing elemental chlorine, aliphatic chlorohydrocarbons and aliphatic oxygen-containing compounds as contaminants, comprising the initial steps of contacting the gas with a metal selected from the group consisting of metals that react with chlorine in aqueous hydrochloric solution to form a metal chloride soluble in said solution, said metal being wet with an aqueous hydrochloric acid solution of a chloride of said metal, and contacting the gas with aqueous sulfuric acid of concentration in the range of about 60 to 100%, followed by the successive steps of contacting the gas thus treated with a paraffinic mineral oil boiling within the range of about 500 to 900° F. to remove from the gas substantially all organic substituents therein remaining, adding from 5 to 20% by weight of air to the thus treated hydrogen chloride gas, and contacting the resulting gas mixture with water at a temperature in the neighborhood of about 50 to about 60° C. to absorb substantially all the hydrogen chloride from the gas and form hydrochloric acid.

5. A process for producing substantially pure hydrochloric acid essentially free from foreign odors from an impure hydrogen chloride gas obtained as a by-product from the chlorination of an aliphatic oxygenated compound, said impure hydrogen chloride gas containing elemental chlorine, aliphatic chlorohydrocarbons and aliphatic oxygen-containing compounds as contaminants, comprising the steps of contacting the impure hydrogen chloride gas with aqueous sulfuric acid, contacting the gas thus treated with aqueous iron chloride solution in the presence of metallic iron, contacting the gas effluent from the last named treatment again with sulfuric acid of concentration in the range of 60 to 100%, contacting the gas effluent from the sulfuric acid treatment with a paraffinic mineral oil boiling within the range of about 500 to 900° F. to remove from the gas substantially all organic substituents therein remaining, adding from 5 to 20% by weight of air to the thus treated hydrogen chloride gas, and contacting the resulting gas mixture with water at a temperature in the neighborhood of about 40 to about 60° C. to absorb substantially all the hydrogen chloride from the gas and form hydrochloric acid.

6. A process for producing substantially pure hydrochloric acid essentially free from foreign odors from an impure hydrogen chloride gas obtained as a by-product from the chlorination of ethanol, said impure hydrogen chloride gas containing elemental chlorine, low aliphatic chlorohydrocarbons and oxygen-containing compounds as contaminants, comprising the steps of contacting the impure hydrogen chloride gas with sulfuric acid of concentration in the range of 60 to 100%, contacting the gas thus treated with aqueous iron chloride solution in the presence of metallic iron, contacting the gas effluent from the last named treatment again with sulfuric acid of concentration in the range of 60 to 100%, contacting the gas effluent from the sulfuric acid treatment with a paraffinic mineral oil boiling within the range of about 500 to 900° F. to remove from the gas substantially all organic substituents therein remaining, adding from 5 to 20% by weight of air to the thus treated hydrogen chloride gas, and contacting the resulting gas mixture with water at a temperature in the neighborhoodt of about 40 to about 60° C. to absorb substantially all the hydrogen chloride from the gas and form hydrochloric acid.

7. The step of removing chlorine from gaseous mixtures of hydrogen chloride and chlorine in which the chlorine is present in a minor proportion, that comprises contacting the gas with a metal selected from the group consisting of metals that react with chlorine in aqueous hydrochloric acid solution to form a metal chloride soluble in said solution, said metal being wet with an aqueous solution containing a high concentration of HCl and containing a chloride of the metal.

8. The step of removing chlorine from gaseous mixtures of hydrogen chloride and chlorine in which the chlorine is present in a minor proportion, that comprises contacting the gas with iron wet with an aqueous solution containing from about 24 to 32% HCl and from about 8 to 29% iron chloride for a time sufficient for the chlorine to react with the iron-iron chloride-aqueous HCl system, and thereafter withdrawing the gas from said contact.

9. A process for recovery of hydrochloric acid of high purity from a hydrogen chloride gas obtained as a by-product from chlorination of an organic compound and containing chlorine and organic impurities as contaminants, comprising the initial steps of contacting the gas with a metal selected from the group consisting of metals that react with chlorine in aqueous hydrochloric acid solution to form a metal chloride soluble in said solution, said metal being wet with an aqueous hydrochloric acid solution of the metal chloride, and scrubbing the gas with aqueous sulfuric acid of concentration at least about 60%, followed by the successive steps of contacting the gas thus treated with an organic liquid no substantial part of which boils below about 400° F., the vapor pressure of which at 20° C. is not greater than 0.1 mm. Hg, capable of dissolving at least 1 gram ethyl chloride vapor per 100 grams scrubbing liquid at 20° C., chemically inert toward HCl and unreactive with the organic compounds in the gas to form volatile reaction products, thereafter adding a minor proportion of a gas which is inert to HCl and of low solubility in water and aqueous hydrochloric acid, and thereafter contacting the resulting gas mixture with water at a temperature substantially below its boiling point to dissolve HCl in the water and form hydrochloric acid.

10. In a process for recovery of hydrochloric acid of high purity from a hydrogen chloride gas containing organic impurities obtained as a by-product from chlorination of an organic compound, the separate stages of treatment of the gas that include scrubbing the gas with sulfuric acid of at least 60% concentration, in a later stage contacting the gas thus treated with an organic liquid no substantial part of which boils below about 400° F., the vapor pressure of which at 20° C. is not greater than 0.1 mm. Hg, capable of dissolving at least 1 gram ethyl chloride vapor per 100 grams scrubbing liquid at 20° C., chemically inert toward HCl and unreactive with the organic compounds in the gas to form volatile reaction products, thereafter adding a minor proportion of a gas which is inert to HCl and of low solubility in water and aqueous hydrochloric acid, and thereafter contacting the resulting gas mixture with water at a temperature substantially below its boiling point to dissolve HCl in the water and form hydrochloric acid.

11. The step of removing chlorine from gaseous mixtures of hydrogen chloride and chlorine in which the chlorine is present to the extent of at least .2% by volume that comprises contacting the gas with iron wet with an aqueous solution containing from about 24 to 32% HCl and from about 8 to 29% iron chloride for a time sufficient for the chlorine to react with the iron-iron chloride-aqueous HCl system, and thereafter withdrawing the gas from said contact.

JEROME W. SPRAUER.
NORMAN D. PESCHKO.

REFERENCES CITED

The following references are of record in the file of this patent:

UNITED STATES PATENTS

| Number | Name | Date |
| --- | --- | --- |
| 934,400 | Goldschmidt et al. | Sept. 14, 1909 |
| 1,421,773 | Snelling | July 4, 1922 |
| 2,021,791 | Ladd | Nov. 19, 1931 |
| 2,137,095 | Peck | Nov. 15, 1938 |
| 2,301,779 | Herold et al. | Nov. 10, 1942 |
| 2,416,011 | Latchum | Feb. 18, 1947 |

OTHER REFERENCES

Industrial and Engineering Chemistry, vol. 30, No. 11, November 1938, pp. 1216, 1217.